United States Patent
Tseng

(10) Patent No.: US 6,761,540 B2
(45) Date of Patent: Jul. 13, 2004

(54) SUSPENSION DEVICE FOR A CEILING FAN

(76) Inventor: Ming-Chi Tseng, No. 18, Chen Hsing Tung Street, Wu Feng Hsiang, Taichung Hsien (TW)

( * ) Notice: Subject to any disclaimer, the term of this patent is extended or adjusted under 35 U.S.C. 154(b) by 17 days.

(21) Appl. No.: 10/291,409

(22) Filed: Nov. 12, 2002

(65) Prior Publication Data

US 2004/0091362 A1 May 13, 2004

(51) Int. Cl.[7] ............................................... F01D 25/00
(52) U.S. Cl. ............................ 416/244 R; 416/210 R; 248/342; 439/537; 403/316
(58) Field of Search ................................ 416/244 R, 5; 248/342–4; 439/537, 576, 440, 441; 403/316, 322.2, 321, 315, 302, 376

(56) References Cited

U.S. PATENT DOCUMENTS 6,176,736 B1 * 1/2001 Hsu ............................ 439/537
6,305,974 B1 * 10/2001 Tseng .......................... 439/537
6,322,232 B1 * 11/2001 Oliver ......................... 362/147
6,364,612 B1 * 4/2002 Tseng ...................... 416/210 R

* cited by examiner

Primary Examiner—Edward K. Look
Assistant Examiner—James McAleenan
(74) Attorney, Agent, or Firm—Rosenberg, Klein & Lee

(57) ABSTRACT

A suspension device for a ceiling fan includes a bracket mounted on the ceiling. A bearing seat is engaged in the bracket. A central hole is defined and extends through the bearing seat. A first slot and a second slot are defined in an inner periphery of the central hole. A first indention and a second indention are defined in a top portion of the bearing seat. A cover is mounted to the top portion of the bearing seat. The cover includes a first channel defined to communicate with the first slot and a second channel defined to communicate with the second slot and the second indention. A shaft is partially received in the central hole. A pin extends through the hollow shaft and has two opposite ends selectively engaged in the bearing seat.

9 Claims, 10 Drawing Sheets

SUSPENSION DEVICE FOR A CEILING FAN

BACKGROUND OF THE INVENTION

1. Field of the Invention

The present invention relates to a suspension device, and more particularly to a suspension device for a ceiling fan.

2. Description of Related Art

With reference to FIGS. 9 and 10 that show a conventional ceiling fan in accordance with the prior. For conveniently packing the conventional ceiling, the motor (81), the hollow shaft (82), the bearing seat (83) and the bracket (84) are respectively packed. Consequently, when assembling ceiling fan, a lower end of the hollow shaft (82) is connected to a base member (802) that is secured on the motor (81) of the ceiling fan by a pin (85). The upper end of the hollow shaft (82) is inserted into the bearing seat (83). A pin (86) extends through the hollow shaft (82) and a locking member (87) inserted to abut the hollow shaft (82) to prevent the hollow shaft (82) from detaching from the bearing seat (83). The bearing seat (83) is engaged in the bracket (84) that is mounted to the ceiling such that the motor (81) and the hollow shaft (82) are secured on the ceiling by the bracket (84). Finally, the electric cords (88, 89) are connected to each other to finish the assembling process.

The hollow shaft (82) and the bearing seat (83) are connected by a pin (86), and the motor (81) and the hollow shaft (82) are connected by a pin (85). However, the motor (81) of a ceiling fan is very heavy such that another assembler is necessary to upwardly hold the motor (81) when mounting the pin (86). Consequently, the conventional suspension device for a ceiling fan is an inconvenient design for DIY.

The present invention has arisen to mitigate and/or obviate the disadvantages of the conventional suspension device for a ceiling fan.

SUMMARY OF THE INVENTION

The main objective of the present invention is to provide an improved suspension device for a ceiling fan.

To achieve the objective, the suspension device for a ceiling fan in accordance with the present invention comprises a bracket mounted on the ceiling. A bearing seat is engaged in the bracket. A central hole is defined and extends through the bearing seat. A first slot and a second slot are defined in an inner periphery of the central hole. A first indention and a second indention are defined in a top portion of the bearing seat. A cover is mounted to the top portion of the bearing seat. The cover includes a first channel defined to communicate with the first slot and a second channel defined to communicate with the second slot and the second indention. A shaft is partially received in the central hole. A pin extends through the hollow shaft and has two opposite ends selectively engaged in the bearing seat.

Further benefits and advantages of the present invention will become apparent after a careful reading of the detailed description with appropriate reference to the accompanying drawings.

DETAILED DESCRIPTION OF THE INVENTION

Figure 1:
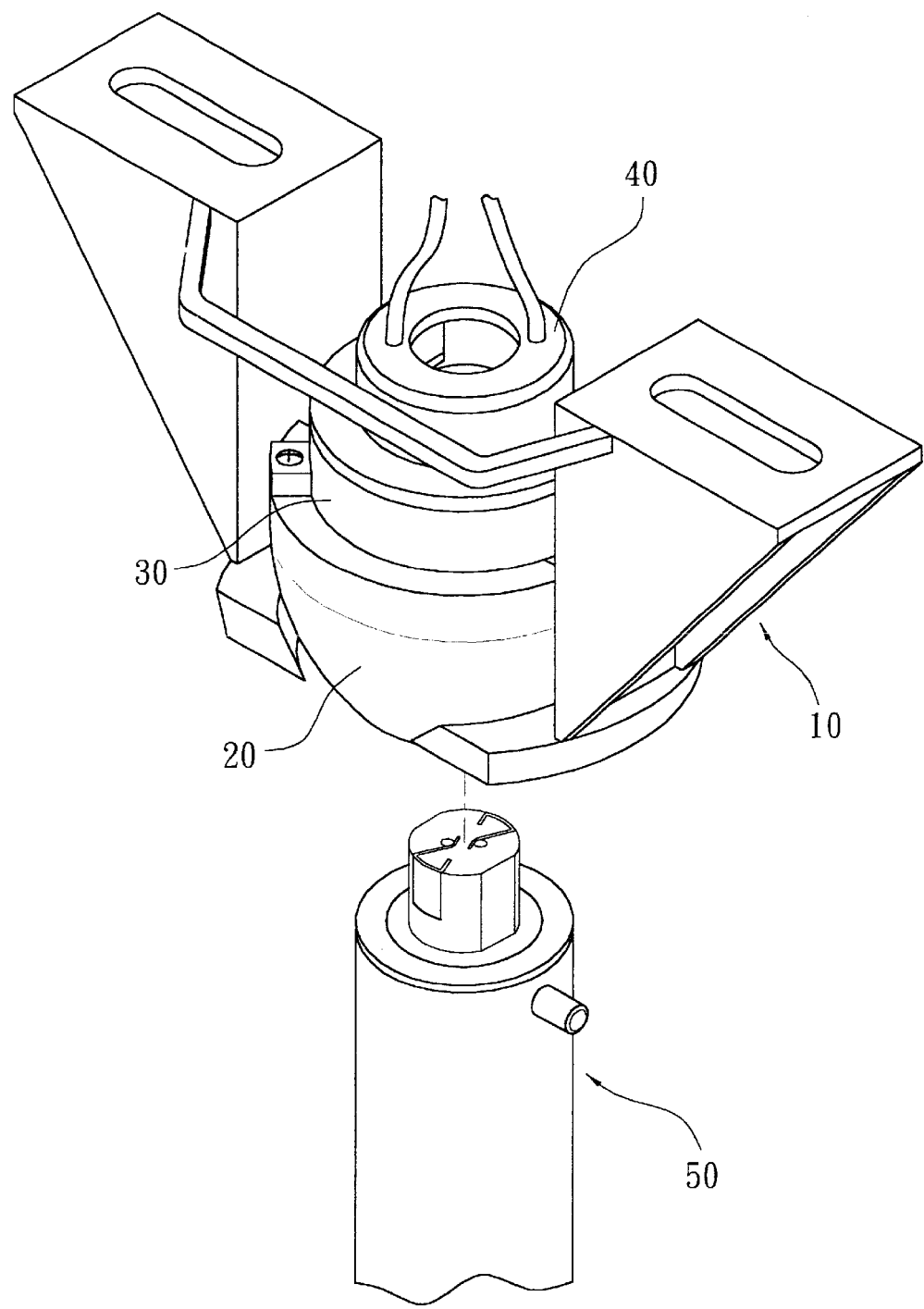
FIG. 1 is a partially exploded perspective view of a suspension device for a ceiling fan in accordance with the present invention.
Figures 2, 2A:
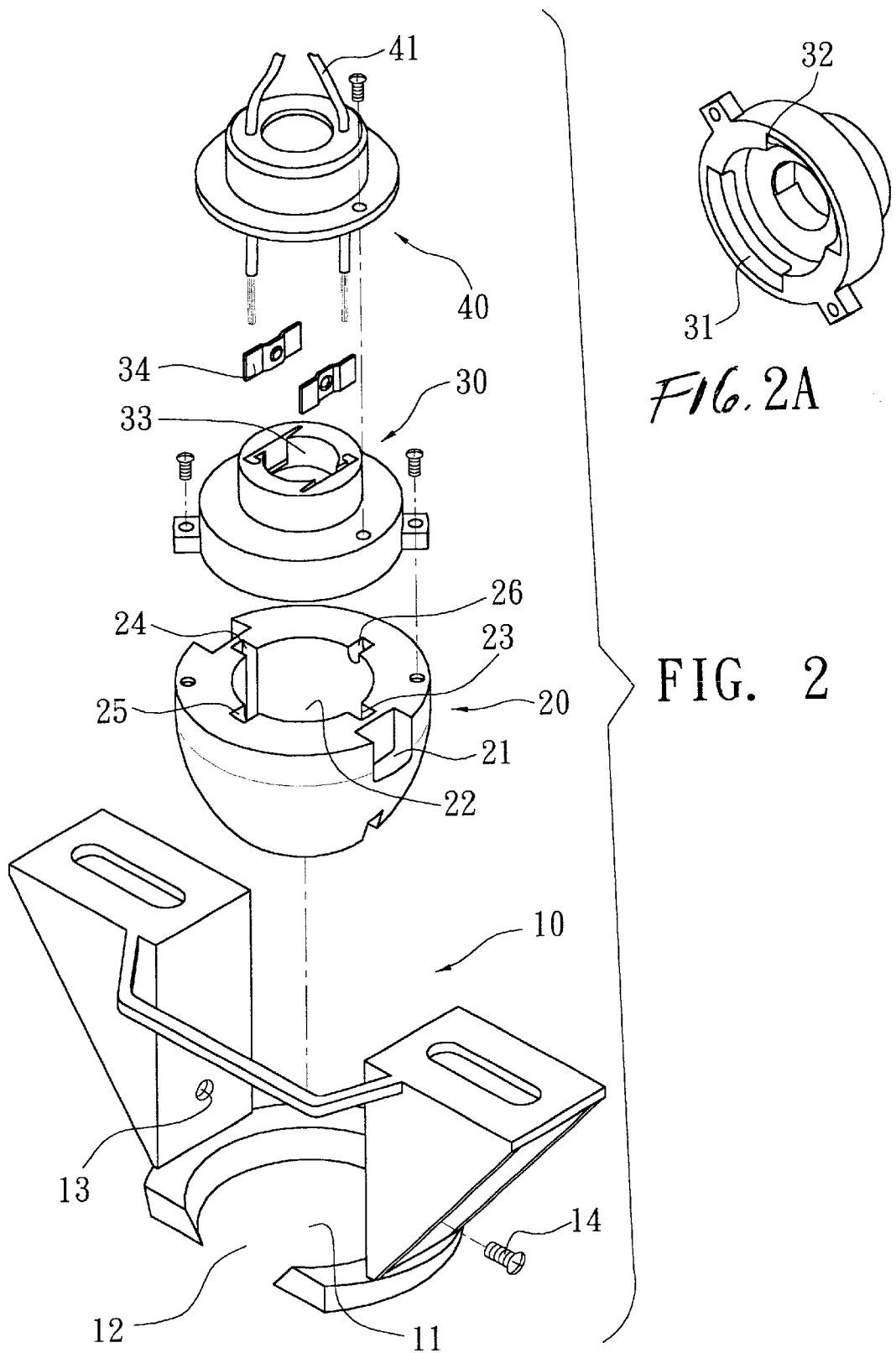
FIG. 2 is a partially exploded perspective view of the suspension device for a ceiling fan in FIG. 1.
Figure 3:
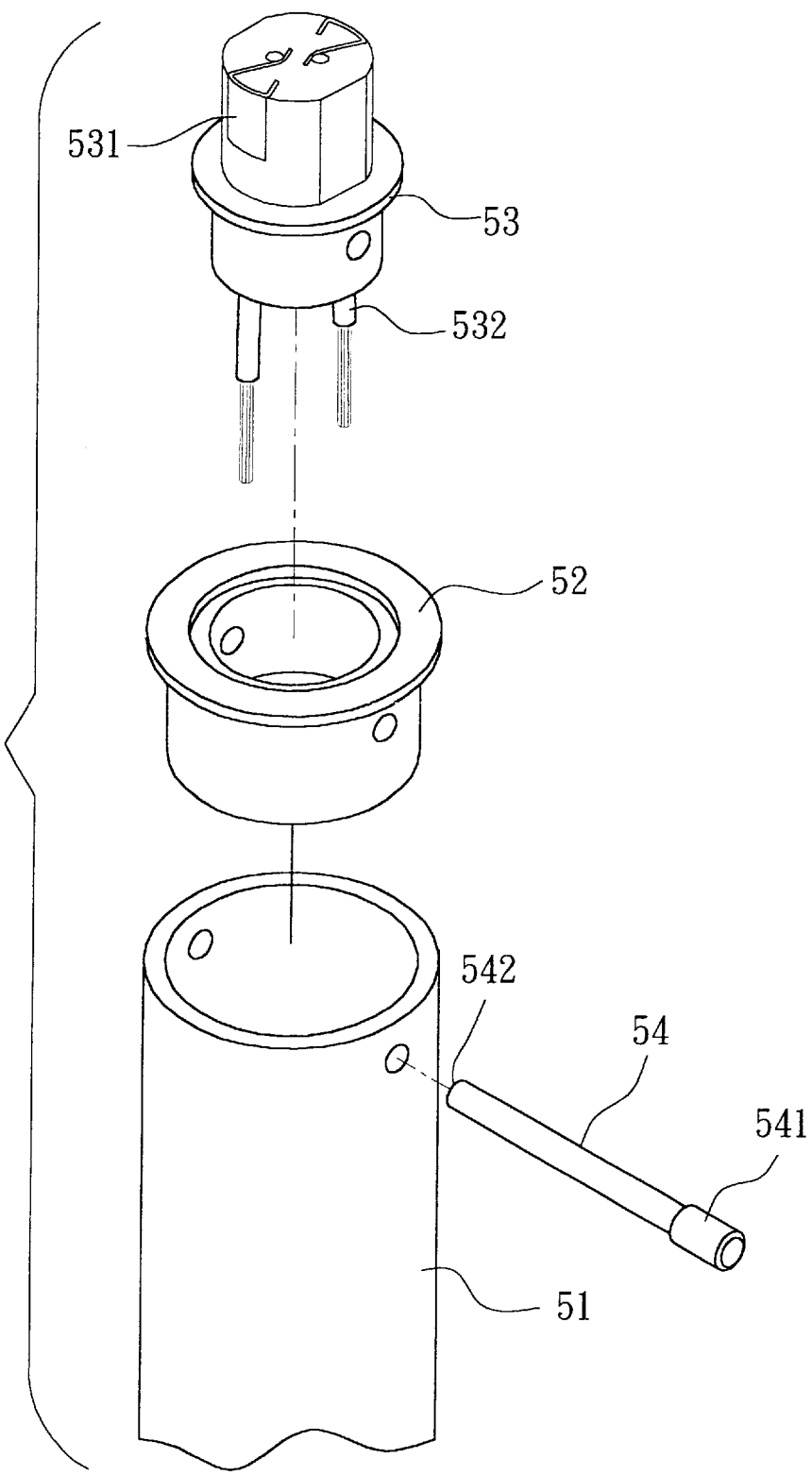
FIG. 3 is an exploded perspective view of a connecting bar of the suspension device in FIG. 1.

With reference to the drawings and initially to FIGS. 1, 2 and 3, a suspension device for a ceiling fan in accordance with the present invention comprises a bracket (10) adapted to be secured on the ceiling, a bearing seat (20) engaged to the bracket (10), a cover (30) mounted on a top portion of the bearing seat (20), an end cap (40) attached to a top portion of the cover (30) and a connecting bar (50) partially received in the bearing seat (20).

The bracket (10) includes a through hole (11) centrally defined in the bracket (10) and having a cone-shaped periphery. A passage (12) is defined in the bracket (10) and laterally communicates with through hole (11) in the bracket (10). Two threaded holes (13) are defined in the bracket (10) and correspond to each other. Each threaded hole (13) has a bole (14) inwardly screwed and extending through the bracket (10).

The bearing seat (20) is an inverted semi-spheroid and has a radius greater than that of the through hole (11) in the bracket (10) such that the bearing seat (20) is engaged to the through hole (11) in the bracket (10). The bearing seat (20) has two recesses (21) defined to receive a free end of a corresponding one of the two bolts (14) to prevent the bearing seat (20) from rotating relative to the bracket (10). A first central hole (22) is longitudinally defined in the bearing seat (20) and extending through the bearing seat (20). A first slot (23) and a second slot (24) are respectively defined in an inner periphery of the first central hole (22). The first slot (23) and the second slot (24) are parallel to each other. The first slot (23) has a width wider than that of the second slot (24). In the preferred embodiment of the present invention, the first slot (23) and the second slot (24) diametrically correspond to each other. A first indention (25) and a second indention (26) are respectively defined in the top portion of the bearing seat (20). The first indention (25) has a width equal to that of the first slot (23) and the second indention (26) has a width equal to that of the second slot (24). In the preferred embodiment of the present invention, the first slot (23), the second slot (24), the first indention (25) and the second indention (26) equally divide the inner periphery of the first central hole (22) to four sections.

Further with reference to FIG. 2A, the cover (30) comprises a first channel (31) and a second channel (32) defined in a bottom of the cover (30). The first channel (31) has a depth equal to the width of the first slot (23) and the second channel (32) has a depth equal to the width of the second slot (24). The first channel (31) communicates with the first slot

(23) and the first indention (25). The second channel (32) communicates with the second slot (24) and the second indention (26). A second central hole (33) is defined in the cover (30) and extends to communicate with the first channel (31), the second channel (32) and the first central hole (22). The cover (30) includes two electrode plates (34) inserted into the top portion of the cover (30) and partially extending into the second central hole (33). The two electrode plates (34) diametrically correspond to each other.

The end cap (40) is attached to the top portion of the cover (30) to hold the two electrode plates (34) in place. Two electrode cords (41) each has a first end electrically connected to a corresponding one of the two electrode plates (34) and a second end electrically connected to a power source on the ceiling.

The connecting bar (50) includes a hollow shaft (51) having a first end rotatably and movably received in the first central hole (22) and a second end adapted to be securely connected to a motor (not shown) of the ceiling fan. A lining (52) is partially received in the first end of the hollow shaft (51). The connecting bar (50) includes a connector (53) has a lower portion received in the lining (52) and an upper portion rotatably and movably received in the second central hole (33). Two electrode poles (531) are diametrically located in the upper portion of the connector (53) and each selectively electrically abuts a corresponding one of the two electrode plates (34). Two electric cords (532) each has a first end electrically connected to a switch (not shown) of the ceiling fan for controlling the motor and a second end electrically connected to a corresponding one of the two electrode poles (531). The connecting bar (50) further includes a pin (54) extending the hollow shaft (51), the lining (52) and the connector (35) to hold the lining (2) and the connector (53) in place. The pin (4) has a first end (541) and a second end (542) respectively extend out of the hollow shaft (51). The first end (541) of the pin (54) has a diameter slightly smaller than the width of the first slot (23) and the second end (42) of the pin (54) has a diameter slightly smaller than the width of the second slot (24).

Figure 4:
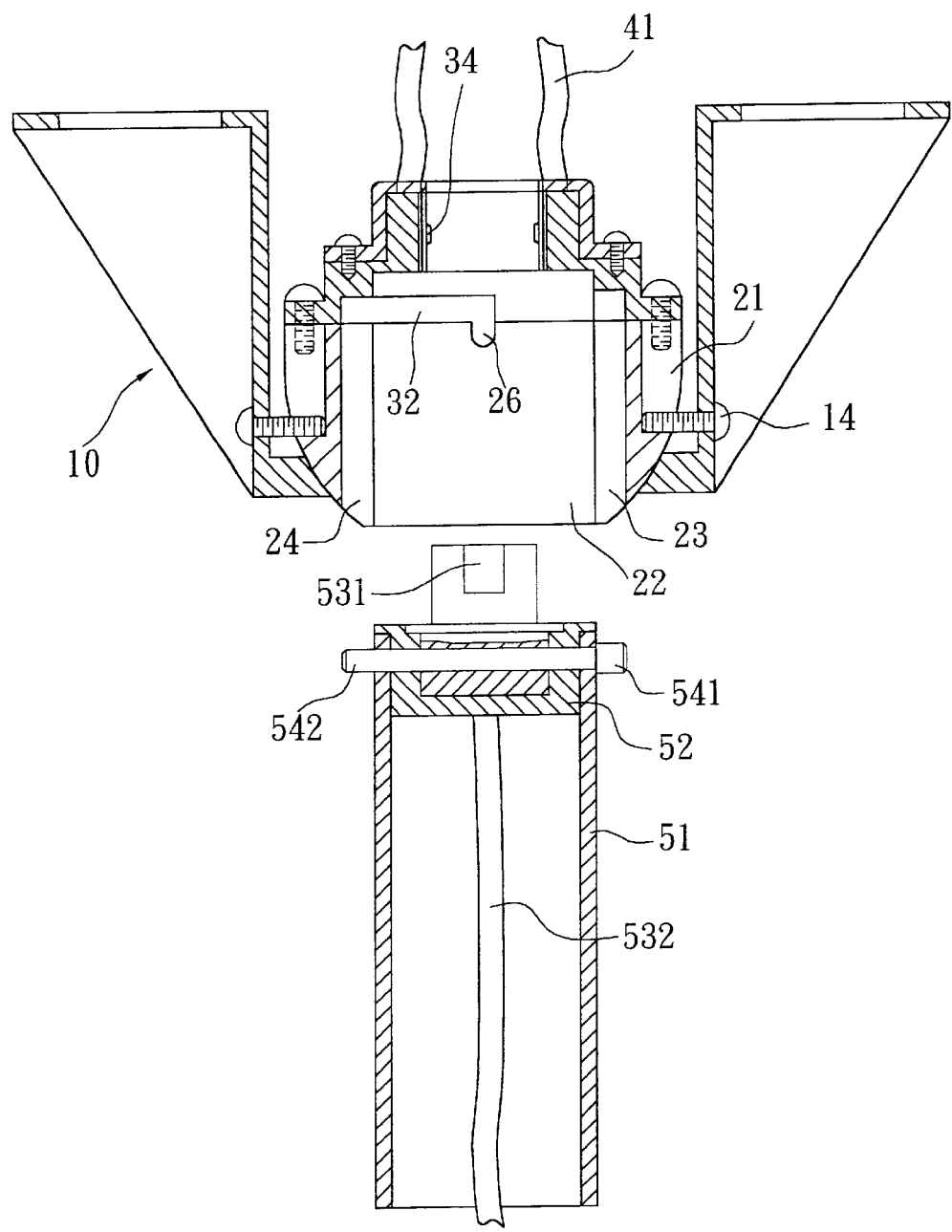
FIG. 4 is a partially exploded view in cross section of the suspension device in FIG. 1.
Figure 5:
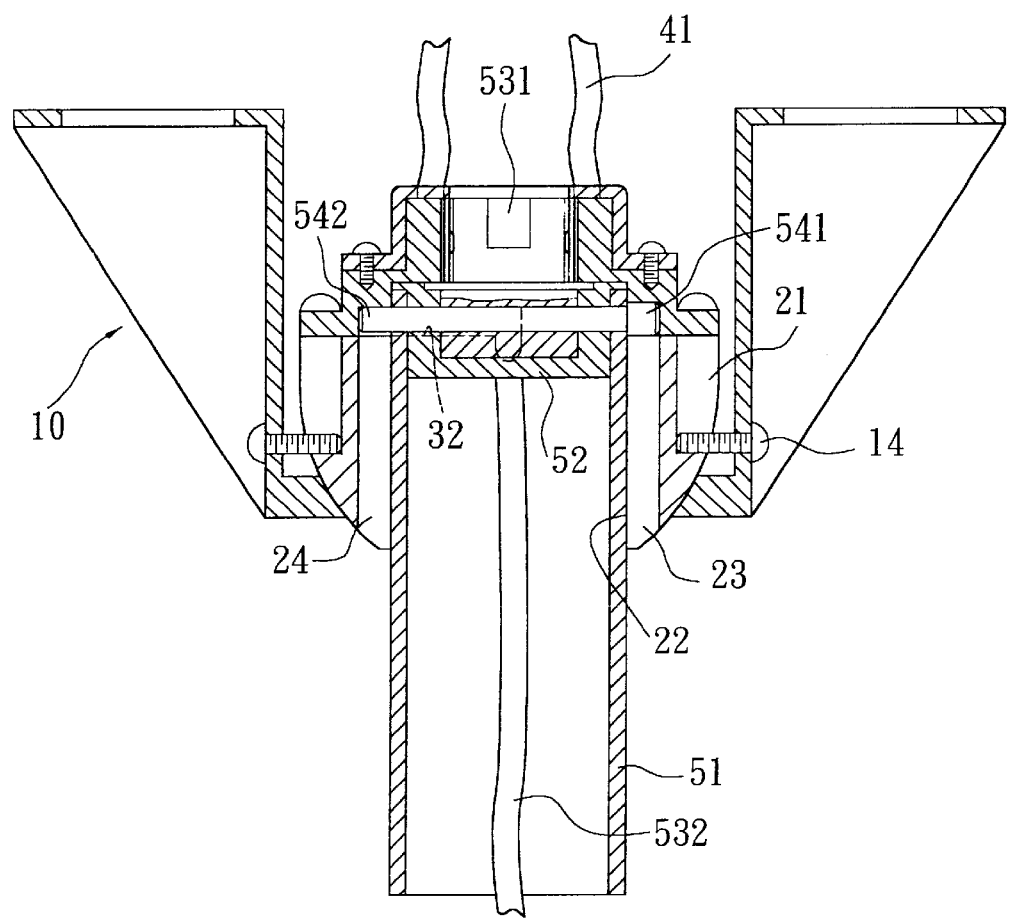
FIG. 5 is an operational cross-sectional view of the suspension device in FIG. 1.
Figure 6:
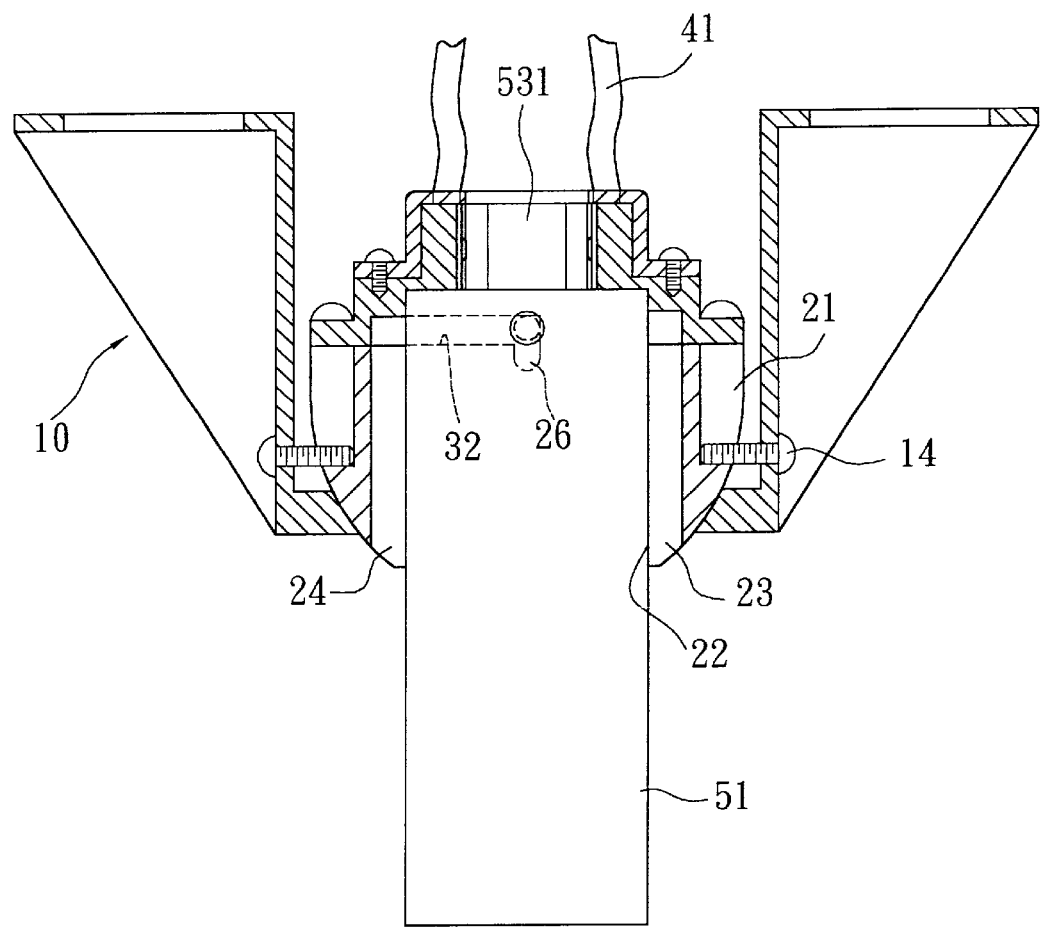
FIG. 6 is an operational cross-sectional view of the suspension device in FIG. 1.

With reference to FIGS. 4, 5 and 6, when assembling the suspension device of the present invention, the first end of the hollow shaft (51) is inserted into the first central hole (22) and the first end (541) and the second end (542) of the pin (54) respectively moved along the first slot (23) and the second slot (24). The hollow shaft (51) is turned when the first end (541) is received in the first channel (31) and the second end (542) of the pin (54) is received in the second channel (32) such that the first end (541) and the second end (542) of the pin (54) are respectively moved along the first channel (31) and the second channel (32). The first end (541) and the second end (542) of the pin (54) are respectively securely received in the first indention (25) and the second indention (26) when the first end (541) and the second end (542) of the pin (54) respectively align with the first indention (25) and the second indention (26) and stop turning the hollow shaft (51) due to the weight of the ceiling fan.

As described above, the electric cords (532) are previously and electrically connected the motor of the ceiling fan and the electrode poles (531) such that the user only needs to upwardly moved the motor of the ceiling fan with the hollow shaft (51) to make the hollow shaft (51) being inserted into the first central hole (22) and turn the hollow shaft (51) for finishing assembling the ceiling. The assembling processes are simplified such that the assembler can completely enjoy the fun of DIY. Furthermore, the first slot (23) and the second slot (24) have different widths, and the first end (541) and the second end (542) of the pin (54) each has a diameter corresponding to the widths of the first slot (23) and the second slot (24). Consequently, the present invention can prevent the electrode poles of the ceiling fan from being set incorrectly.

Figure 7:
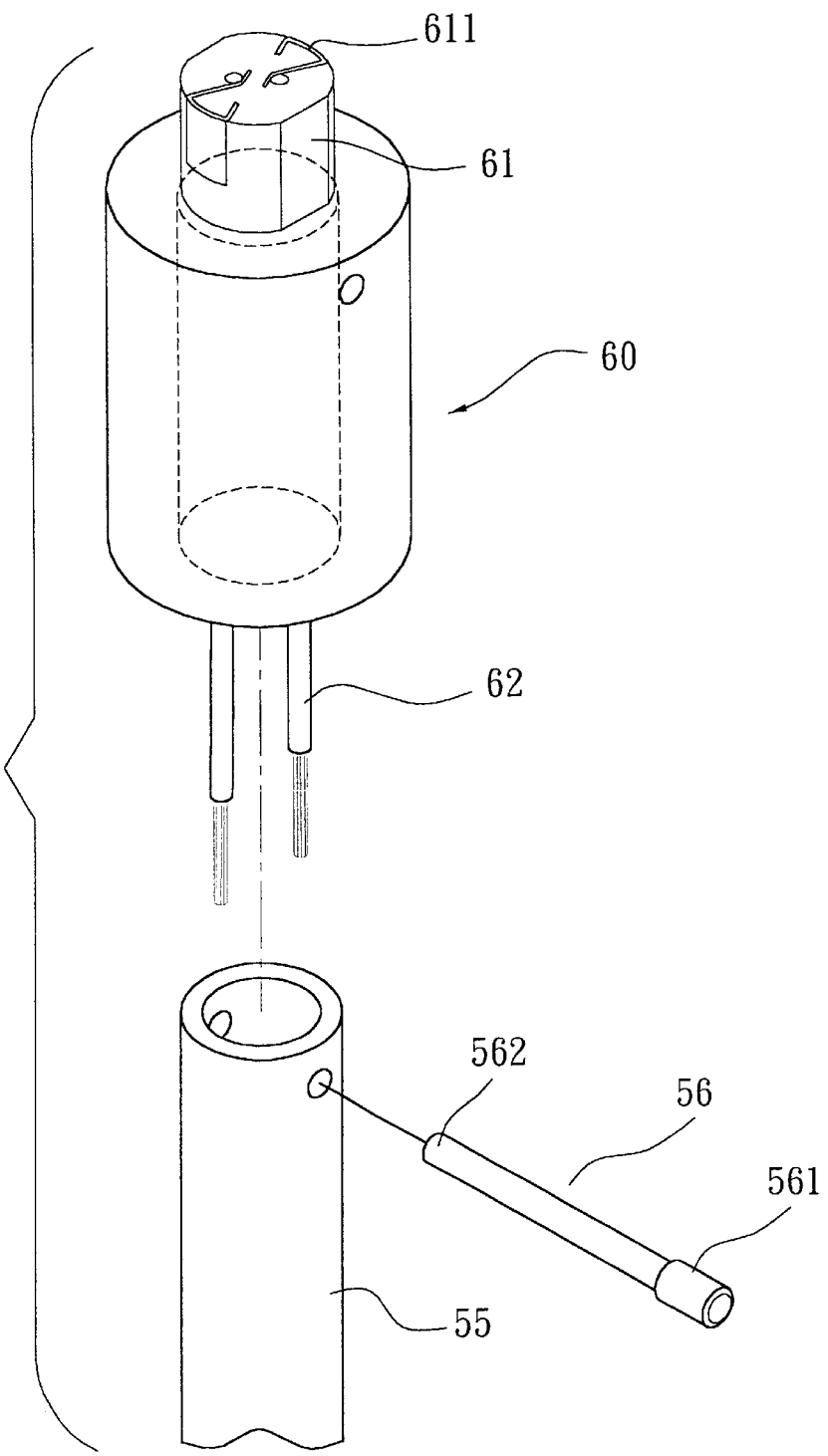
FIG. 7 is an exploded perspective view of another embodiment of the connecting bar of the present invention.
Figure 8:
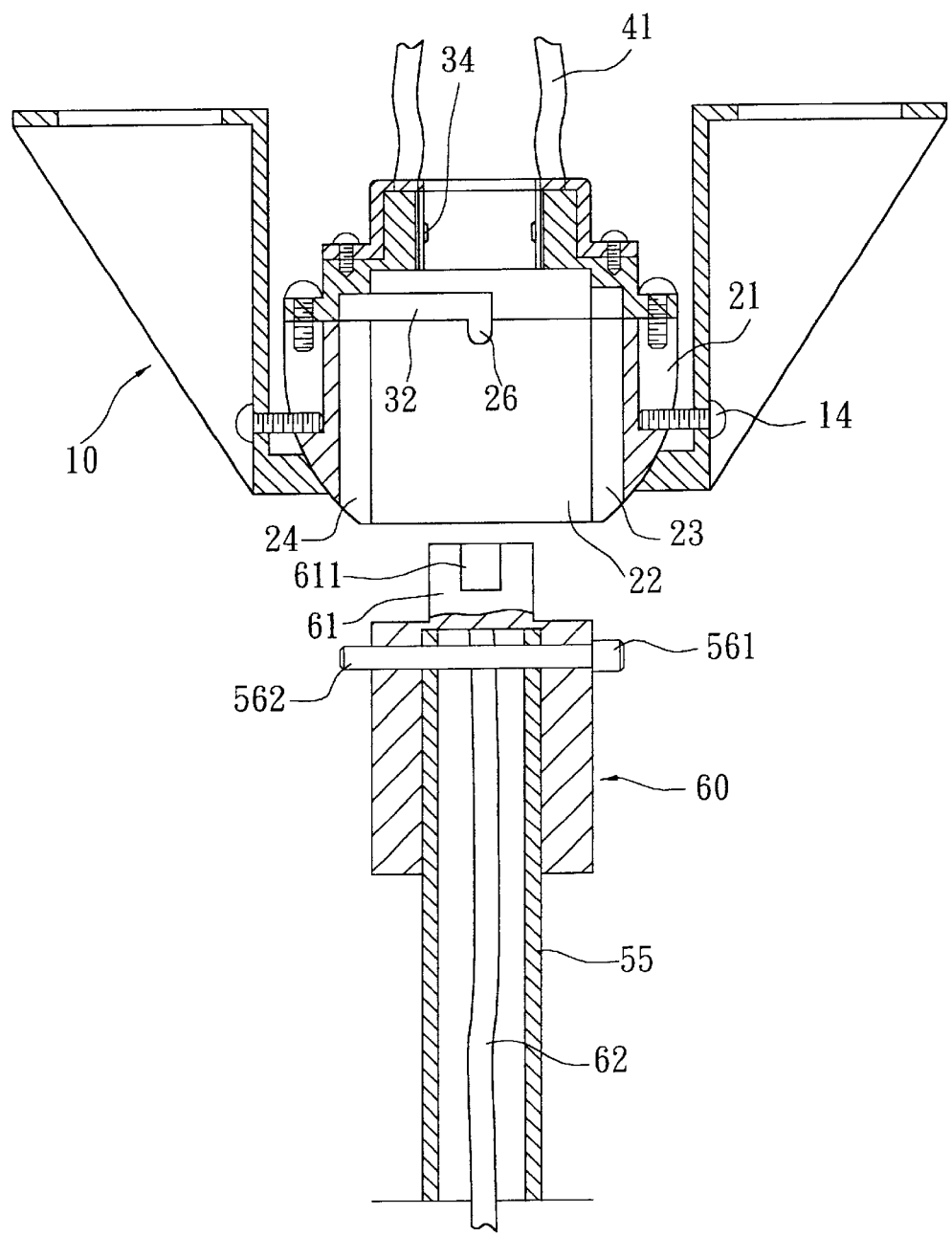
FIG. 8 is an operational cross-sectional view of the connecting bar of the suspension device in FIG. 7.
Figure 9:
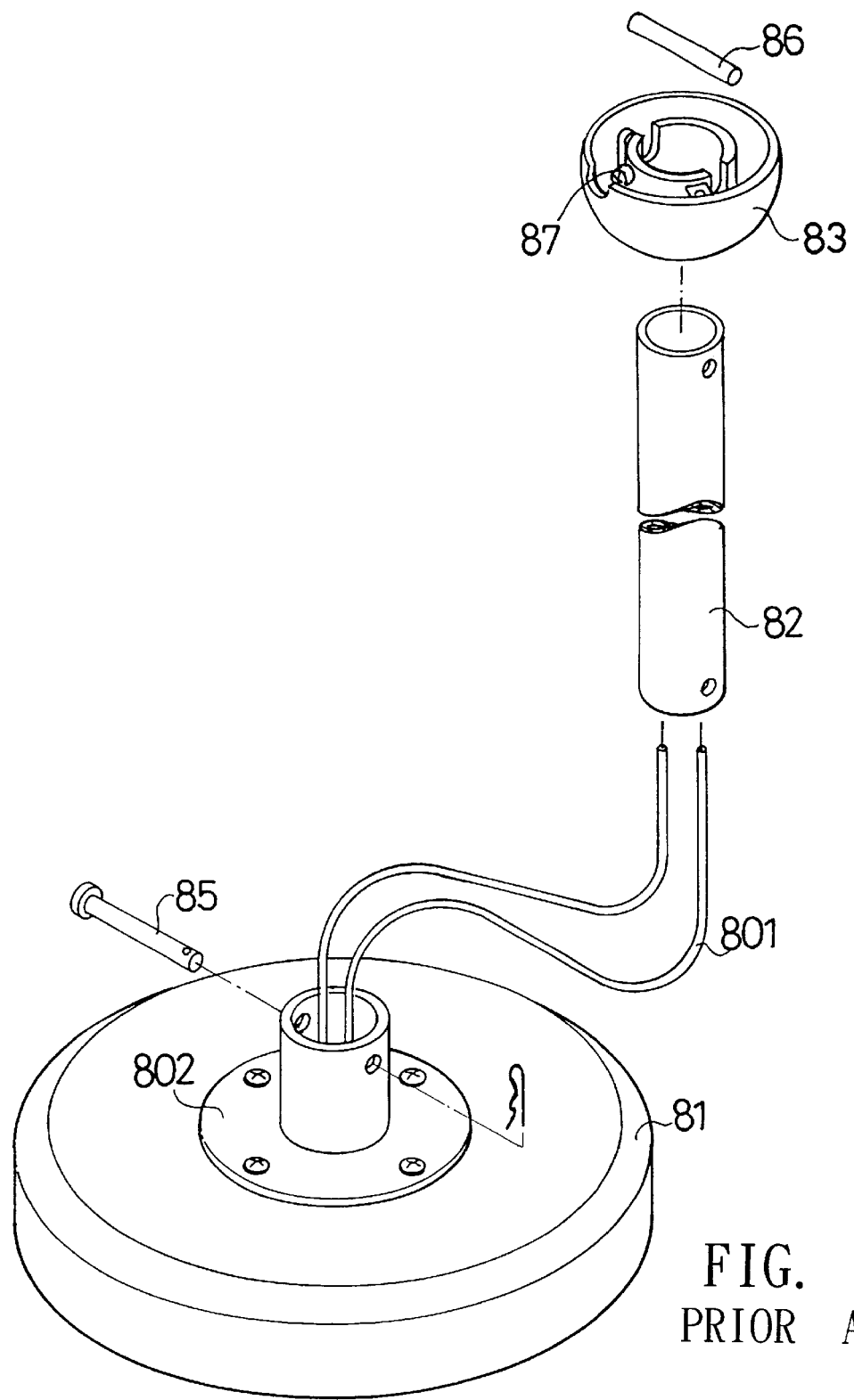
FIG. 9 is an exploded perspective view of a suspension device for a ceiling fan in accordance with the prior art.
Figure 10:
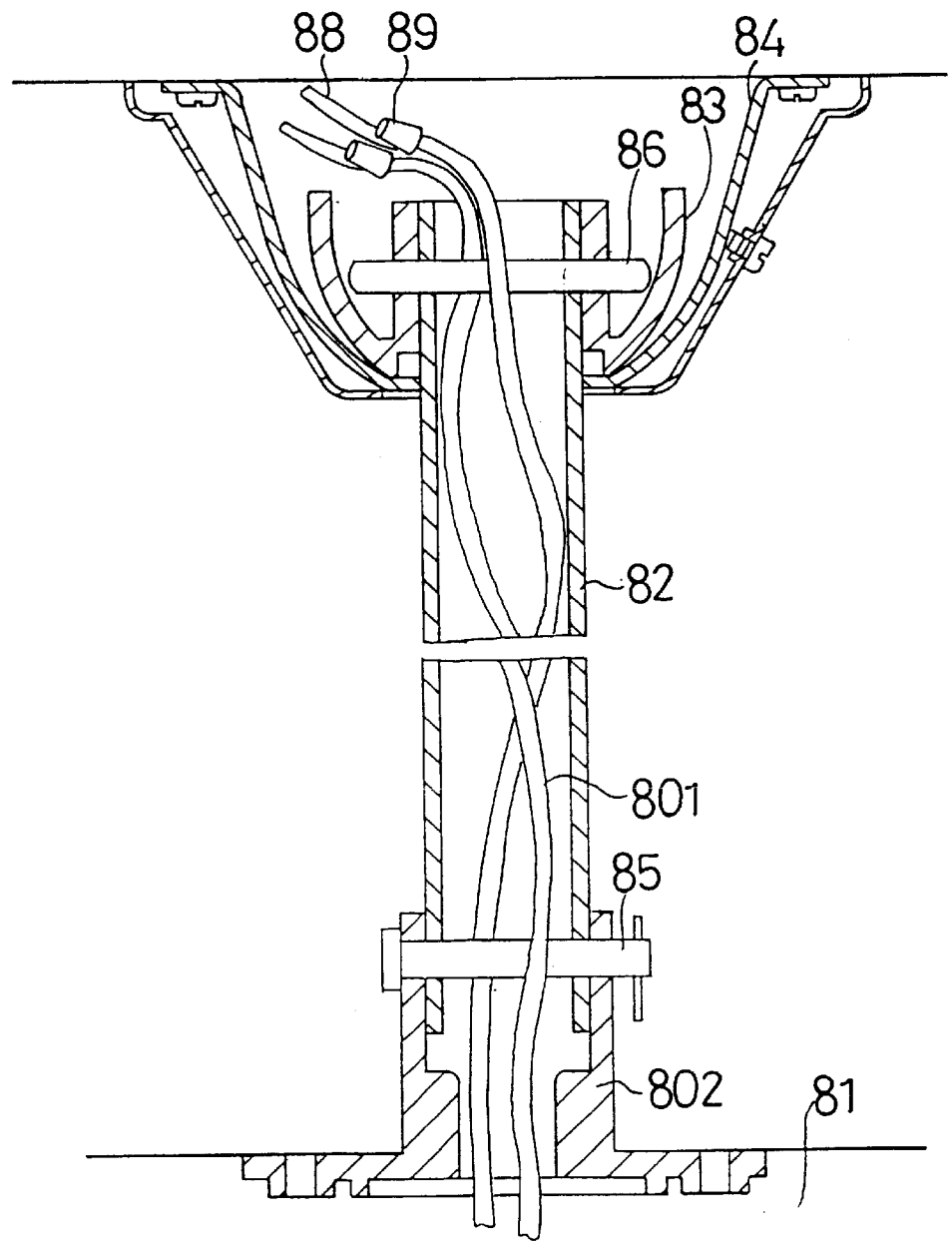
FIG. 10 is cross-sectional view of the suspension device in FIG. 9

With reference to FIGS. 7 and 8, it is another embodiment of the connecting bar (50). The lining (60) is sleeved on the first end of the hollow shaft (55) and the connector (61) is integrally extending from the lining (60). Two electrode poles (611) are located in the connector (61) and diametrically correspond to each other and two electric cords are respectively electrically connected to the motor of the ceiling fan and the electrode poles (611). The assembling processes of the embodiment are the same as the above embodiment.

Although the invention has been explained in relation to its preferred embodiment, it is to be understood that many other possible modifications and variations can be made without departing from the spirit and scope of the invention as hereinafter claimed.

What is claimed is:

1. A suspension device for a ceiling fan, comprising:

a bracket adapted to be mounted on the ceiling and including a through hole centrally defined in the bracket and having a cone-shaped periphery, a passage defined in the bracket and laterally communicates with through hole in the bracket, two threaded holes are defined in the bracket and correspond to each other, each threaded hole having a bolts inwardly screwed and extending through the bracket;

a bearing seat engaged in the through hole in the bracket, the bearing seat being an inverted semi-spheroid and having a radius greater than that of the through hole in the bracket, the bearing seat having two recesses defined to receive a free end of a corresponding one of the two bolts to prevent the bearing seat from rotating relative to the bracket, a first central hole longitudinally defined in the bearing seat and extending through the bearing seat, a first slot and a second slot respectively defined in an inner periphery of the first central hole, the first slot and the second slot being parallel to each other, a first indention and a second indention respectively defined in a top portion of the bearing seat;

a cover mounted to the top portion of the bearing seat, the cover including a first channel and a second channel defined in a bottom of the cover, the first channel communicating with the first slot and the first indention, the second channel communicating with the second slot and the second indention, a second central hole defined in the cover and extending to communicate with the first channel, the second channel and the first central hole, the cover including two electrode plates inserted into a top portion of the cover and partially extending into the second central hole;

an end cap attached to the top portion of the cover to hold the two electrode plates in place, two electrode cords each having a first end electrically connected to a corresponding one of the two electrode plates and a second end adapted to be electrically connected to a power source on the ceiling; and a connecting bar including a hollow shaft having a first end rotatably and movably received in the first central hole and a second end adapted to be securely connected to a motor of the ceiling fan, a lining mounted on the first end of the hollow shaft, a connector upwardly extending from the lining and two electrode poles diametrically located in an upper portion of the connector and each selectively electrically abuts a corresponding one of the two electrode plates, the connecting bar including a pin extending through the hollow shaft, the lining and the connector to hold the lining and the connector in place, the pin having a first end and a second end respectively extend out of the hollow shaft, the first end of the pin moved in the first slot and the first channel and selectively received in the first indention, the second end of the pin moved in the second slot and the second channel and selectively received in the second indention.

2. The suspension device for a ceiling fan as claimed in claim 1, wherein the first slot has a width wider than that of the second slot, the first slot and the second slot diametrically correspond to each other, the first indention has a width equal to that of the first slot and the second indention has a width equal to that of the second slot, the first end of the pin has a diameter slightly smaller than the width of the first slot and the second end of the pin has a diameter slightly smaller than the width of the second slot.

3. The suspension device for a ceiling fan as claimed in claim 2, wherein the first channel has a depth equal to the width of the first slot and the second channel has a depth equal to the width of the second slot.

4. The suspension device for a ceiling fan as claimed in claim 3, wherein the first slot, the second slot, the first indention and the second indention equally divide the inner periphery of the first central hole to four sections.

5. The suspension device for a ceiling fan as claimed in claim 4, wherein the connector has a lower portion received in the lining and an upper portion rotatably and movably received in the second central hole.

6. The suspension device for a ceiling fan as claimed in claim 4, wherein the connector integrally upwardly extends from the lining.

7. The suspension device for a ceiling fan as claimed in claim 2, wherein the first slot, the second slot, the first indention and the second indention equally divide the inner periphery of the first central hole to four sections.

8. The suspension device for a ceiling fan as claimed in claim 7, wherein the connector has a lower portion received in the lining and an upper portion rotatably and movably received in the second central hole.

9. The suspension device for a ceiling fan as claimed in claim 7, wherein the connector integrally upwardly extends from the lining.

* * * * *